(12) United States Patent
Lee et al.

(10) Patent No.: US 11,921,216 B2
(45) Date of Patent: Mar. 5, 2024

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Taehee Lee, Suwon-si (KR); Jinpyo Gwak, Suwon-si (KR); Hyunseok Hong, Suwon-si (KR); Hyunwoo Kim, Suwon-si (KR); Yeongrok Lee, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 299 days.

(21) Appl. No.: 17/119,370

(22) Filed: Dec. 11, 2020

(65) Prior Publication Data

US 2021/0181349 A1 Jun. 17, 2021

Related U.S. Application Data

(60) Provisional application No. 62/946,531, filed on Dec. 11, 2019.

(30) Foreign Application Priority Data

Feb. 28, 2020 (KR) .................. 10-2020-0024758

(51) Int. Cl.
*G01S 17/894* (2020.01)
*G01S 7/48* (2006.01)
(Continued)

(52) U.S. Cl.
CPC .......... *G01S 17/894* (2020.01); *G01S 7/4808* (2013.01); *G06T 7/521* (2017.01); *G06T 7/55* (2017.01);
(Continued)

(58) Field of Classification Search
CPC ....... G01S 17/894; G01S 7/4808; G06T 7/55; G06T 2207/10028; G06T 2207/20224
See application file for complete search history.

(56) References Cited

U.S. PATENT DOCUMENTS

| 8,902,411 B2 | 12/2014 | Park et al. |
|---|---|---|
| 8,953,152 B2 | 2/2015 | Min et al. |

(Continued)

FOREIGN PATENT DOCUMENTS

| JP | 2016-180724 A | 10/2016 |
|---|---|---|
| JP | 2017-125764 A | 7/2017 |

(Continued)

OTHER PUBLICATIONS

International Search Report and Written Opinion dated Mar. 15, 2021, issued by the International Searching Authority in International Application No. PCT/KR2020/018101 (PCT/ISA/210 and 237).

(Continued)

*Primary Examiner* — Luke D Ratcliffe
(74) *Attorney, Agent, or Firm* — Sughrue Mion, PLLC

(57) ABSTRACT

An electronic apparatus is provided. The electronic apparatus according to the disclosure includes: a light emitter; a light receiver; a memory; and a processor, wherein the processor is configured to: acquire a first depth image based on first reflected light acquired during a first time period and store the first depth image in the memory, acquire a second depth image based on second reflected light acquired during a second time period following the first time period, and acquire distance information between the electronic apparatus and the object included in the second depth image by subtracting a first depth value of each pixel of the first depth image from a second depth value of each pixel of the second depth image, and correct the distance information by using (Continued)

a compensation value acquired based corresponding to time information on the second time period.

22 Claims, 13 Drawing Sheets

(51) Int. Cl.
*G06T 7/521* (2017.01)
*G06T 7/55* (2017.01)

(52) U.S. Cl.
CPC .............. *G06T 2207/10028* (2013.01); *G06T 2207/20224* (2013.01)

(56) References Cited

U.S. PATENT DOCUMENTS

| | | | |
|---|---|---|---|
| 2012/0123718 A1* | 5/2012 | Ko | G01C 25/00 702/85 |
| 2012/0242975 A1 | 9/2012 | Min et al. | |
| 2013/0201228 A1 | 8/2013 | Billerbeck et al. | |
| 2014/0362364 A1 | 12/2014 | Waligorski | |
| 2015/0070683 A1* | 3/2015 | Lepere | G01S 17/10 356/5.01 |
| 2016/0005179 A1 | 1/2016 | Petyushko et al. | |
| 2016/0007009 A1 | 1/2016 | Offenberg | |
| 2016/0116594 A1* | 4/2016 | Xu | G01S 17/32 356/5.1 |
| 2016/0198147 A1* | 7/2016 | Waligorski | G01S 7/4914 348/49 |
| 2017/0227640 A1 | 8/2017 | Nomura et al. | |
| 2018/0059245 A1 | 3/2018 | Meinherz et al. | |
| 2018/0106599 A1 | 4/2018 | Takahashi | |
| 2018/0139376 A1 | 5/2018 | Passarella et al. | |
| 2019/0018119 A1* | 1/2019 | Laifenfeld | G01S 7/4865 |
| 2019/0072654 A1 | 3/2019 | Becker | |

FOREIGN PATENT DOCUMENTS

| | | |
|---|---|---|
| JP | 6328966 B2 | 5/2018 |
| JP | 6387786 B2 | 9/2018 |
| JP | 2019-95216 A | 6/2019 |
| KR | 10-1722641 B1 | 4/2017 |
| KR | 10-1788032 B1 | 10/2017 |

OTHER PUBLICATIONS

Gupita, et al., "Phasor Imaging: A Generalization of Correlation-Based Time-of-Flight Imaging", 2015, ACM Transactions on Graphics, vol. 34, No. 5, Article 156, 18 pages total.

Bhandari, et al., "Resolving Multi-path Interference in Time-of-Flight Imaging via Modulation Frequency Diversity and Sparse Regularization", 2014, Optics Letters, vol. 39, Issue 06, 11 pages total.

Li, et al., "SH-ToF: Micro Resolution Time-of-Flight Imaging with Superheterodyne Interferometry", 2018, 11 pages total.

Achar, et al., "Epipolar Time-of-Flight Imaging", 2017, ACM Transaction on Graphics, vol. 36, issue No. 4, Article 37, 8 pages total.

Communication dated Jan. 4, 2023 by the European Patent Office in European Patent Application No. 20898983.0.

Communication dated Sep. 19, 2022 issued by the European Patent Office in European Application No. 20898983.0.

* cited by examiner

100

ELECTRONIC APPARATUS AND METHOD FOR CONTROLLING THEREOF

CROSS-REFERENCE TO RELATED APPLICATION(S)

This application is based on and claims priority under 35 U.S.C. § 119 to Korean Patent Application No. 10-2020-0024758, filed on Feb. 28, 2020, in the Korean Intellectual Property Office, and U.S. Provisional Patent Application No. 62/946,531, filed on Dec. 11, 2019, in the U.S. Patent and Trademark Office, the disclosures of which are incorporated herein by reference in their entireties.

BACKGROUND

1. Field

The disclosure relates to an electronic apparatus and a method for controlling thereof, and more particularly, to an electronic apparatus for acquiring distance information of an object based on a depth image and a method for controlling thereof.

2. Description of Related Art

A time of flight (TOF) sensor acquires distance information of an object based on flight time or phase information of light of an emitted towards the object. The TOF sensor is divided into a direct TOF method that measures a round trip flight time of light and an indirect TOF method that measures a phase difference between emitted light and reflected light according to a method of acquiring the distance information.

The TOF sensor using the direct TOF method has a disadvantage in that it requires an expensive time to digital converter (TDC) element for high-speed measurement, and thus has a high unit cost. In addition, because the TOF sensor using the indirect TOF method measures the distance based on the phase difference between the emitted light and the reflected light, there is a problem in that it is not possible to accurately measure an object located at a distance that exceeds one period of an emitted light signal.

Accordingly, there is a need for a technology capable of measuring an object existing at a long distance at low cost.

SUMMARY

Provided is an electronic apparatus capable of measuring a distance of an object existing at a long distance by using a phase shift of light.

Additional aspects will be set forth in part in the description which follows and, in part, will be apparent from the description, or may be learned by practice of the presented embodiments.

According to an aspect of the disclosure, there is provided an electronic apparatus comprising: a light emitter configured to emit light towards an area around the electronic apparatus as emitted light; a light receiver configured to acquire reflected light from an object that reflects the emitted light emitted from the light emitter; a memory storing one or more instructions; and a processor configured to execute the one or more instructions to: acquire a first depth image based on first reflected light acquired through the light receiver during a first time period and store the first depth image in the memory, acquire a second depth image based on second reflected light acquired through the light receiver during a second time period following the first time period, and acquire distance information between the electronic apparatus and the object included in the second depth image by subtracting a first depth value of each pixel of the first depth image stored in the memory from a second depth value of each pixel of the second depth image, and correct the distance information by using a compensation value acquired based on time information corresponding to the second time period.

The processor may be further configured to execute the one or more instructions to acquire the compensation value based on the time information corresponding to the second time period and a wavelength of the emitted light.

The processor may be further configured to execute the one or more instructions to: acquire image data based on the emitted light and the first reflected light, acquire phase information of the first reflected light based on the image data, and acquire the first depth image based on the phase information of the first reflected light.

The light receiver may include a plurality of sensors including a first sensor and a second sensor, and the processor may be further configured to execute the one or more instructions to: control the light receiver so that the first sensor and the second sensor are activated at a preset time difference, acquire the image data by acquiring first image data and second image data based on the first reflected light acquired by each of the first sensor and the second sensor, and acquire the phase information on the first reflected light based on the first image data and the second image data.

The light receiver may include a first sensor unit and a second sensor unit, each of the first and second sensor units including a plurality of sensors, and the processor may be further configured to execute the one or more instructions to control the light receiver so that the first sensor unit is activated in synchronization with the first time period and the second sensor unit is activated in synchronization with the second time period.

The electronic apparatus may further comprise a lens unit provided on an emission path of the emitted light, the lens unit being configured to adjust an emission range of the emitted light, wherein the processor may be further configured to execute the one or more instructions to control the lens unit to adjust the emission range of the emitted light in synchronization with the first time period and the second time period.

The lens unit may include a non-reflective coating member configured to prevent at least a portion of the reflected light acquired by the light receiver from being reflected by the light receiver and then reflected by the lens unit to reach the light receiver again.

The processor may be further configured to execute the one or more instructions to: acquire a confidence image indicating reliability of the second depth value of each pixel of the second depth image, and update the second depth image using the confidence image.

According to another aspect of the disclosure, there is provided a method for controlling an electronic apparatus, the method comprising: emitting light toward an area around the electronic apparatus as emitted light; acquiring reflected light from an object that reflects the emitted light emitted from a light emitter; acquiring and storing a first depth image based on first reflected light acquired during a first time period; acquiring a second depth image based on second reflected light acquired during a second time period following the first time period; and acquiring distance information between the electronic apparatus and the object included in the second depth image by subtracting a first depth value of each pixel of the stored first depth image from a second depth value of each pixel of the second depth image, and correcting the distance information by using a compensation value acquired based on time information corresponding to the second time period to acquire the distance.

The correcting of the distance may include acquiring the compensation value based on the time information corresponding to the second time period and a wavelength of the emitted light.

The acquiring of the first depth image may include: acquiring image data based on the emitted light and the first reflected light, acquiring phase information of the first reflected light based on the image data, and acquiring the first depth image based on the phase information on the first reflected light.

In the acquiring of the phase information, the phase information on the first reflected light may be acquired based on a plurality of image data acquired through a plurality of sensors activated at a preset time difference.

The acquiring of the first depth image may include controlling a first sensor unit and a second sensor unit so that the first sensor unit and the second sensor unit each including a plurality of sensors are activated in synchronization with the first time period and the second time period, respectively.

The method may further comprises controlling an emission range of the emitted light in synchronization with the first time period and the second time period.

The acquiring of the second depth image may include: acquiring a confidence image indicating reliability of the second depth value of each pixel of the second depth image, and updating the second depth image using the confidence image.

According to another aspect of the disclosure, there is provided an electronic apparatus comprising: a memory storing one or more instructions; and a processor configured to execute the one or more instructions to: acquire a first reflected light during a first time period; acquire the second reflected light during a second time period; acquire a first depth image based on the first reflected light; acquire a second depth image based on the second reflected light; acquire distance information on a first object in the second depth image after performing correction on the second depth image by acquiring a virtual depth image by subtracting a first depth value of each pixel of the first depth image from a second depth value of each pixel of the second depth image.

The first reflected light and the second reflected light may be acquired by repeatedly emitting light in an area around the electronic apparatus.

The first depth image may include first depth information on a second object, and the second depth image includes second depth information on the first object and the second object.

The processor may be further configured to execute the one or more instructions to acquire a compensation value for performing the correction on the second depth image based on a frequency of the emitted light, luminous flux, and a number corresponding to the second time period.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
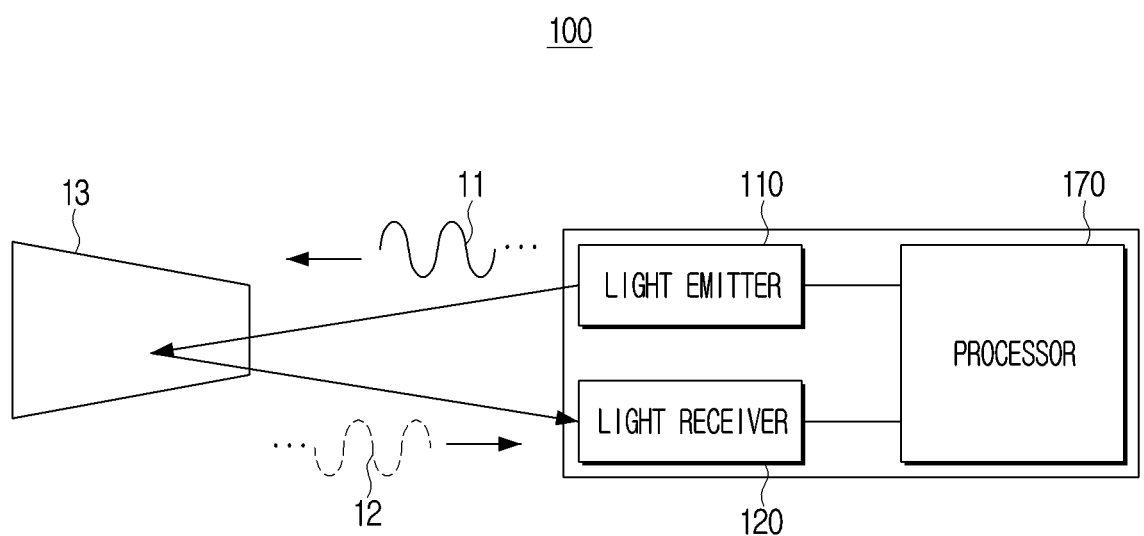
FIG. 1 is a diagram illustrating a configuration of an electronic apparatus according to an embodiment of the disclosure.

General terms that are widely used during the preparation of this disclosure were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

Embodiments of the disclosure may apply various modifications and have various embodiments, and specific embodiments will be illustrated in the drawings and described in detail in the detail description. However, this is not intended to limit the scope to the specific embodiment, and it should be understood to include all modifications, equivalents, and substitutes included in the scope of the disclosed spirit and technology. In describing the embodiments, when it is determined that the detailed description of the related known technology may obscure the gist, the detailed description thereof will be omitted.

Terms 'first', 'second', and the like, may be used to describe various components, but the components are not to be construed as being limited by the terms. The terms are used only to distinguish one component from other components.

Singular expressions include plural expressions unless the context clearly indicates otherwise. It should be further understood that terms "include" or "constitute" used in the application specify the presence of features, numerals, steps, operations, components, parts, or combinations thereof mentioned in the specification, but do not preclude the presence or addition of one or more other features, numerals, steps, operations, components, parts, or combinations thereof.

Hereinafter, embodiments will be described in detail with reference to the accompanying drawings so that those skilled in the art to which the disclosure pertains may easily practice the disclosure. However, the disclosure may be implemented in various different forms and is not limited to the embodiments described herein. In addition, in the drawings, portions unrelated to the description will be omitted to obviously describe the disclosure, and similar portions will be denoted by similar reference numerals throughout the specification.

FIG. 1 is a diagram for describing an operation of an electronic apparatus 100 according to an embodiment. According to an embodiment, the electronic apparatus 100 may be a TOF sensor, but is not limited thereto. According to another embodiment, the electronic apparatus 100 may be one of various electronic devices equipped with a TOF sensor. For example, the electronic device may be one of various robot devices having a TOF sensor to measure a distance of a surrounding object. The robot device may be a robot cleaner, but is not limited thereto.

Referring to FIG. 1, the electronic apparatus 100 may include a light emitter 110, a light receiver 120, and a processor 170. Meanwhile, a detailed description of each component of the electronic apparatus 100 will be described later with reference to FIG. 3, and an operation of the electronic apparatus 100 will be described below.

The electronic apparatus 100 may emit emitted light 11 toward an object 13 using the light emitter 110. In addition, the electronic apparatus 100 may receive reflected light 12 reflected from the object 13 through the light receiver 120. The reflected light 12 being emitted light 11 reflected by the object 13. At this time, the electronic apparatus 100 may acquire a distance from the electronic apparatus 100 to the object 13 based on a flight time of the emitted light 11, that is, the time from which the emitted light 11 is emitted from the electronic apparatus 100 and unit time the reflected light is received again by the electronic apparatus 100.

As an example of a method of acquiring a distance using the flight time of light, there is a direct TOF method. The TOF sensor using the direct TOF method calculates the flight time of the light by comparing an emission time point of the emitted light 11 and a reception time point of the reflected light 12, and acquires distance information on the object 13 based on the calculated flight time. On the other hand, the TOF sensor using the direct TOF method needs to modulate the emitted light 11 at high speed in order to acquire an accurate time point at which the reflected light 12 is received, and needs to include an expensive time to digital converter (TDC) element for high-speed measurement. Therefore, the related art TOF sensor using the direct TOF method has a disadvantage in that the manufacturing cost is high.

As another example of the method of acquiring the distance using the flight time of light, there is an indirect TOF method. The indirect TOF method refers to a method of calculating the flight time of light based on a phase difference between the emitted light 11 and the reflected light 12, that is, a phase shift of light. Hereinafter, the indirect TOF method will be described in more detail with reference to FIGS. 2 and 3.

Figure 2:
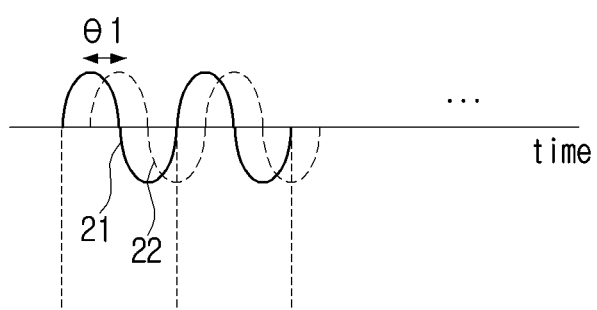
FIG. 2 is a diagram for describing an indirect TOF method.
Figure 3:
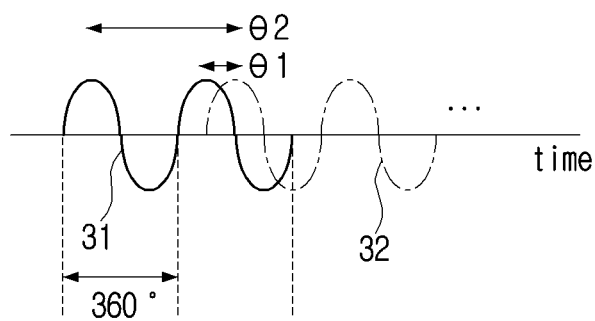
FIG. 3 is a diagram for describing an indirect TOF method.

FIGS. 2 and 3 are diagrams for describing an indirect TOF method; As described above, a sensor using an indirect TOF method (hereinafter, an indirect TOF sensor) may acquire first phase information about the emitted light 21 and second phase information about the reflected light 22. The indirect TOF sensor may acquire a first phase difference $\theta1$ by comparing the first phase information and the second phase information and acquire distance information on the object 13 based on the first phase difference $\theta1$.

On the other hand, the indirect TOF sensor has a problem when long distance measurement is needed, because it may not be possible to identify a phase difference of 360 degrees or more. Specifically, the indirect TOF sensor calculates the distance of the object based on a phase of the emitted light and a phase of the reflected light belonging to a time period in which the reflected light is acquired. Therefore, as illustrated in FIG. 3, when the reflected light 32 having a phase difference of 360 degrees or more with the emitted light 31 is acquired, the indirect TOF sensor calculates the distance of the object 13 based on the first phase difference $\theta1$, not the second phase difference $\theta2$, that is, $\theta1+360°$.

Accordingly, the indirect TOF sensor acquires a distance value smaller than an actual distance of the object 13 as the distance of the object 13. For this reason, the indirect TOF sensor has a problem in that it is not possible to acquire an accurate distance to the object 13 located at a long distance (that is, when the phase of the emitted light and the reflected light differs by 360 degrees or more).

Hereinafter, an electronic apparatus 100 capable of acquiring an accurate distance to an object located at a long distance unlike the related art indirect TOF sensor while using the indirect TOF method described above will be described.

Figure 4:
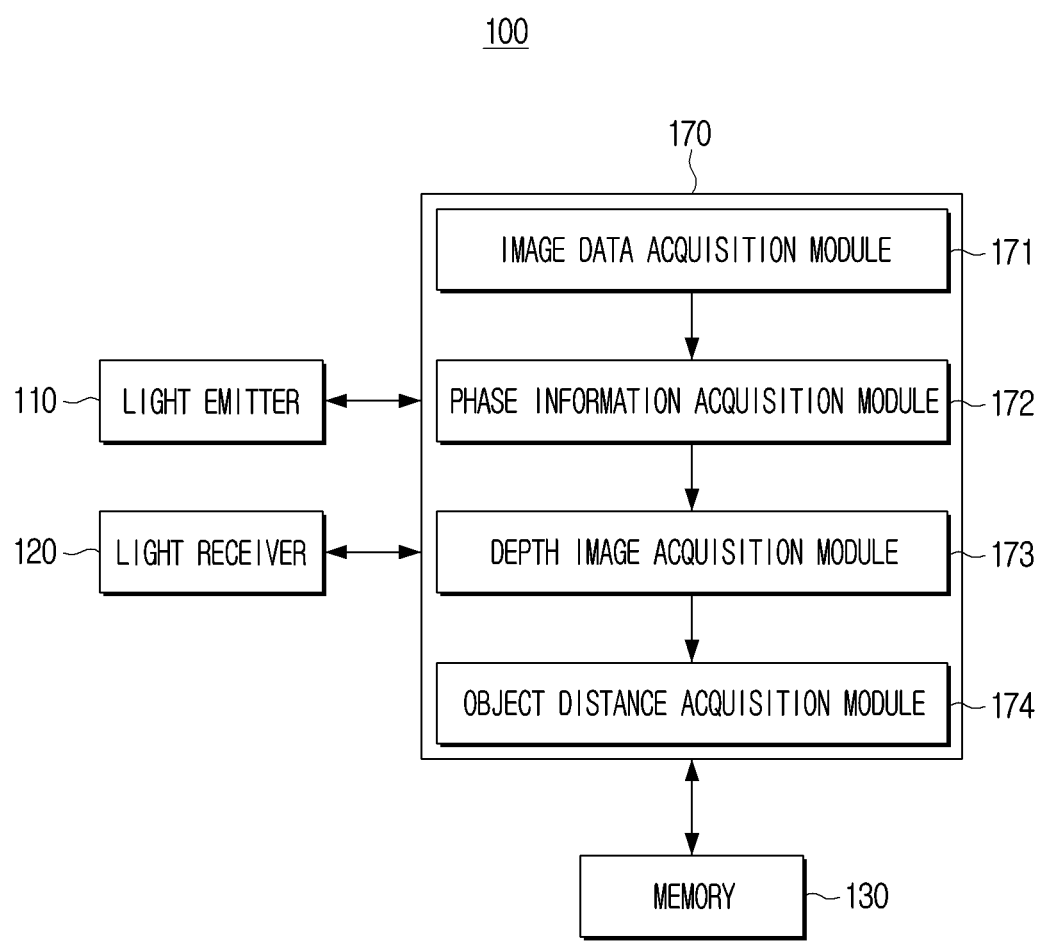
FIG. 4 is a diagram illustrating a configuration of the electronic apparatus according to an embodiment.

FIG. 4 is a diagram illustrating a configuration of the electronic apparatus according to an embodiment.

Referring to FIG. 4, the electronic apparatus 100 may include the light emitter 110, the light receiver 120, a memory 130, and the processor 170. The electronic apparatus 100 may be a TOF sensor or various electronic devices equipped with the TOF sensor. For example, the electronic device may be various robot devices including a robot cleaner, but is not limited thereto. On the other hand, the electronic apparatus 100 does not necessarily have to be implemented including all of the above-described components, and may be implemented by omitting or adding some components.

Hereinafter, configuration of the above-described components will be described in detail.

The light emitter 110 may emit light toward the object. At this time, the light (hereinafter, the emitted light) emitted from the light emitter 110 may have a waveform in the form of a sinusoidal wave. However, this is only an example, and the emitted light may have a waveform in the form of a square wave. In addition, the light emitter 110 may include various types of laser elements. For example, the light emitter 110 may include a vertical cavity surface emitting laser (VCSEL) or a laser diode (LD). Meanwhile, the light emitter 110 may include a plurality of laser elements. At this time, the plurality of laser elements may be arranged in an array form. In addition, the light emitter 110 may emit light of various frequency bands. For example, the light emitter 110 may emit a laser beam having a frequency of 100 MHz.

The light receiver 120 may be a component for acquiring reflected light reflected from the object. The light receiver 120 may include various types of sensor elements. For example, the light receiver 120 may include a charge-coupled device (CCD) sensor, a complementary metal-oxide-semiconductor (CMOS) sensor, a photodiode (PD), and an avalanche photodiode (APD). In addition, the light receiver 120 may include a plurality of sensor units configured with a plurality of sensor elements (or sensors). At this time, each of the plurality of sensor elements and sensor units may be arranged in an array form. The plurality of sensors may be activated at a preset time interval to acquire the reflected light at a preset time interval.

The memory 130 may store an operating system (OS) for controlling the overall operation of the components of the electronic apparatus 100 and commands or data related to the components of the electronic apparatus 100. According to an embodiment, the memory 130 may be implemented as a non-volatile memory (e.g., a hard disk, a solid state drive (SSD), or a flash memory), a volatile memory, or the like.

The processor 170 may control an overall operation of the electronic apparatus 100. The processor 170 may include an image data acquisition module 171, a phase information acquisition module 172, a depth image acquisition module 173, and an object distance acquisition module 174.

The image data acquisition module 171 may acquire image data based on the reflected light acquired by the light receiver 120. According to an embodiment, the image data acquisition module 171 may acquire the image data based on an electrical signal for reflected light and an electrical signal for emitted light. The image data may be a pixel value for each pixel of an image acquired through the light receiver 120. Meanwhile, the image data acquisition module 171 may acquire image data corresponding to each reflected light acquired by the plurality of sensors included in the light receiver 120. When the plurality of sensors acquire the reflected light at a certain interval, the image data acquisition module 171 may acquire the image data for each reflected light acquired at a certain interval. According to the embodiment, the interval may have a preset time difference. For example, the image data acquisition module 171 may acquire first to fourth image data acquired by first to fourth sensors at preset time intervals.

The phase information acquisition module 172 may acquire phase information on the reflected light based on the image data acquired through the image data acquisition module 171. The phase information may include a phase difference value between the emitted light and the reflected light corresponding to each pixel of the light receiver 120. Specifically, the phase information acquisition module 172 may acquire the phase difference between the emitted light and the reflected light by applying the first to fourth image data acquired through the image data acquisition module 171 to a predefined mathematical expression. Meanwhile, a method of acquiring the phase difference between the emitted light and the reflected light will be described later in more detail with reference to FIGS. 6A and 6B.

The depth image acquisition module 173 may acquire a depth image based on the phase information acquired through the phase information acquisition module 172. Specifically, the depth image acquisition module 173 may acquire a flight time of light acquired through the light receiver 120, corresponding to the light emitted from the light emitter 110, based on the phase difference value between the emitted light and reflected light included in the phase information. That is, the depth image acquisition module 173 may acquire the flight time of light using the indirect TOF method. In addition, the depth image acquisition module 173 may acquire a depth value of each pixel of the depth image based on the flight time of light.

The object distance acquisition module 174 may acquire distance information on an object included in the depth image based on the depth image acquired through the depth image acquisition module 173. Here, the distance information on the object may mean a distance from the electronic apparatus 100 to the object. Specifically, the object distance acquisition module 174 may detect an object based on a distribution of the depth value of each pixel of the depth image. In addition, the object distance acquisition module 174 may acquire a depth value of a pixel corresponding to the detected object as a distance to the object.

Meanwhile, the depth image acquired through the depth image acquisition module 173 may include an error due to the characteristics of the indirect TOF method. In particular, a depth value of a pixel corresponding to an object existing at a distance of a preset distance range or more from the electronic apparatus 100 may have an error. Therefore, the object distance acquisition module 174 may correct the distance to the object acquired based on the depth image.

The object distance acquisition module 174 may acquire a plurality of depth images at every interval (i.e., at every preset time period). For example, the object distance acquisition module 174 may acquire a first depth image corresponding to a first time period and store the first depth image in the memory 130. In addition, the object distance acquisition module 174 may acquire a second depth image corresponding to a second time period that is a time period immediately following the first time period.

The object distance acquisition module 174 may perform an operation of subtracting a depth value of each pixel of the first depth image from a depth value of each pixel of the second depth image. At this time, the object distance acquisition module 174 may acquire distance information on at least one of the objects included in the second depth image. In particular, the object distance acquisition module 174 may acquire distance information on a second object that exists in the second depth image but does not exist in the first depth image. Specifically, the object distance acquisition module 174 may acquire distance information on the second object by identifying a depth value of a pixel corresponding to the second object.

In addition, the object distance acquisition module 174 may correct the distance information on the second object by using a compensation value acquired based on time information on the second time period. At this time, the object distance acquisition module 174 may acquire the compensation value based on the time information on the second time period and a wavelength of the emitted light emitted from the light emitter 110. The object distance acquisition module 174 may acquire the corrected distance information of the second object by adding the acquired compensation value to the depth value of the pixel corresponding to the second object. In this way, the object distance acquisition module 174 may acquire distance information on an object included only in a depth image corresponding to a current time period by subtracting a depth image corresponding to an immediately previous time period from the depth image corresponding to the current time period. Meanwhile, a more detailed operation of the object distance acquisition module 174 will be described later with reference to FIG. 5.

Meanwhile, the processor 170 may control the light receiver 120 so that the reflected light reflected from the object is acquired at a preset time interval and the plurality of sensors are activated at a preset time interval.

Each of the modules included in the above-described processor 170 may be implemented as software, but this is only an example and may be implemented as hardware or a combination of software and hardware. Hereinafter, an object acquisition operation of the electronic apparatus will be described in more detail.

Figure 5:
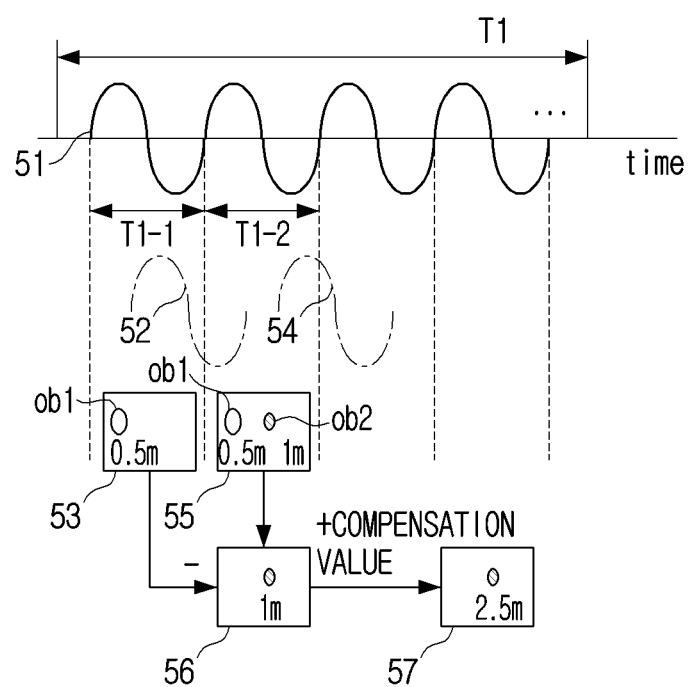
FIG. 5 is a diagram for describing an operation of the electronic apparatus according to an embodiment.

FIG. 5 is a diagram for describing an operation of the electronic apparatus according to an embodiment.

The electronic apparatus 100 may acquire first reflected light 52 and second reflected light 54 by repeatedly emitting emitted light 51 within a first time section T1. Specifically, the electronic apparatus 100 may acquire the first reflected light 52 during a first time period T1-1, which is a first time period within the time section T1, and may acquire the second reflected light 54 during a second time period T1-2, which is a second time period.

The electronic apparatus 100 may acquire a first depth image 53 based on the first reflected light 52 and may acquire a second depth image 55 based on the second reflected light 54. At this time, the first depth image 53 may include distance information on a first object ob1. The second depth image 55 may include distance information on the first object ob1 and a second object ob2.

The electronic apparatus 100 may acquire distance information on the first object ob1, that is, a distance from the electronic apparatus 100 to the first object ob1 based on the first depth image 53. At this time, because the first reflected light 52 has a phase difference of within 360 degrees from a first periodic signal of the emitted light, the electronic apparatus 100 may acquire the distance information on the first object ob1 without correcting depth data of the first depth image 53.

On the other hand, because the second reflected light 54 has a phase difference of 360 degrees or more with the first periodic signal of the emitted light, depth data of the second depth image 55 may include an error. In particular, a distance value (or depth data) of the second object ob2 that does not exist in the first depth image 53 but exists in the second depth image 55 may be smaller than an actual distance value of the second object ob2. Therefore, the electronic apparatus 100 may acquire the distance information on the second object ob2 after performing correction on the depth data of the second depth image 55.

Specifically, the electronic apparatus 100 may acquire a virtual depth image 56 by subtracting the depth value of each pixel of the first depth image 53 from the depth value of each pixel of the second depth image 55. At this time, a depth value of a pixel corresponding to the first object ob1 commonly included in the first depth image 53 and the second depth image 55 may be reduced to be less than a threshold value.

In addition, the electronic apparatus 100 may acquire a compensation value for correcting the depth value of the pixel corresponding to the second object ob2. Specifically, the electronic apparatus 100 may acquire the compensation value ($d_a$) using [Mathematical Expression 1].

$$d_a = \left(\frac{1}{2} \cdot C_L \cdot \frac{1}{f}\right) \times (n-1) \quad \text{[Mathematical expression 1]}$$

Here, f denotes a frequency of the emitted light signal, $C_L$ denotes luminous flux (i.e., 300M m/s), and n denotes time information of a time period.

For example, the first compensation value for correcting the first depth image 53 acquired based on the first reflected light 52 acquired in the first time period T1-1 becomes 0 (i.e., n is 1). As another example, the second compensation value for correcting the second depth image 55 acquired based on the second reflected light 54 acquired in the second time period T1-2 is $$\frac{1}{2} \cdot C_L \cdot \frac{1}{f}.$$

The electronic apparatus 100 may correct the distance information of the object by adding the acquired compensation value to the distance information of the object included in the depth image. For example, when f is 100 MHz, the electronic apparatus 100 may acquire corrected object distance information 57 by adding the second compensation value (i.e., 1.5 m) to the depth value of the pixel corresponding to the second object ob2. Meanwhile, in FIG. 5, the virtual depth image 56 is illustrated as an image for convenience of explanation, but the electronic apparatus 100 may acquire the corrected object distance information 57 based on the first depth image 53 and the second depth image 55 without generating the virtual depth image 56. In addition, in FIG. 5, only the first time section T1 has been described for convenience of explanation, but the electronic apparatus 100 may acquire the corrected object distance information 57 in a plurality of time sections. In addition, the electronic apparatus 100 may correct the distance information of the object by calculating the compensation value based on the time period corresponding to the depth image acquired within each of the plurality of time periods. At this time, a size of each time section including the first time section T1 may be determined based on at least one of a time point at which the emitted light 51 is emitted and a measurement range of the electronic apparatus 100.

Meanwhile, as described above, the electronic apparatus 100 may acquire the phase information on the reflected light, that is, the phase difference between the emitted light and the reflected light, based on the image data acquired every preset time period. In addition, the electronic apparatus 100 may acquire the depth image based on the phase information. Hereinafter, an operation of the electronic apparatus 100 described above will be described with reference to FIGS. 6A and 6B.

Figure 6A:
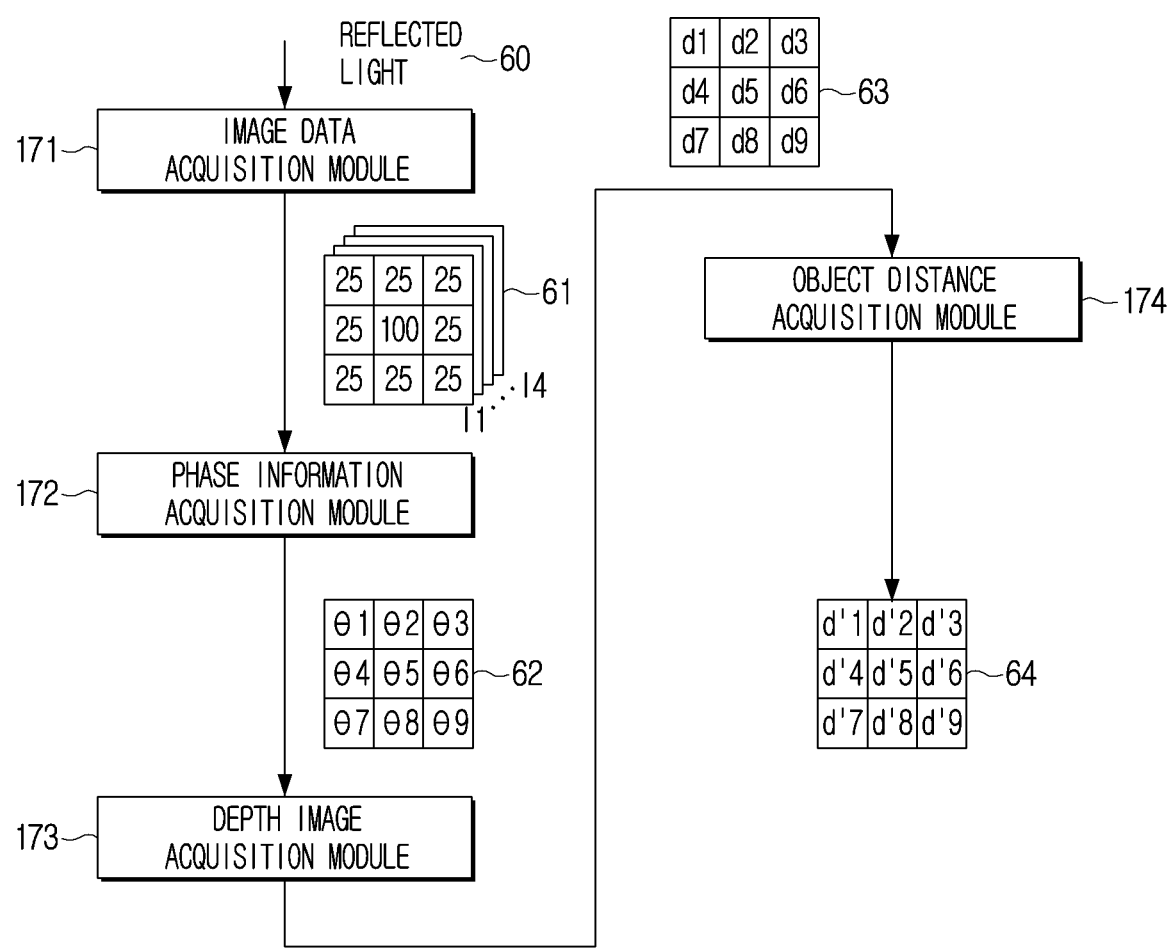
FIG. 6A is a flowchart for describing the operation of the electronic apparatus according to an embodiment.

FIG. 6A is a flowchart for describing the operation of the electronic apparatus according to an embodiment. The electronic apparatus 100 may include an image data acquisition module 171, a phase information acquisition module 172, a depth image acquisition module 173, and an object distance acquisition module 174.

Figure 6B:
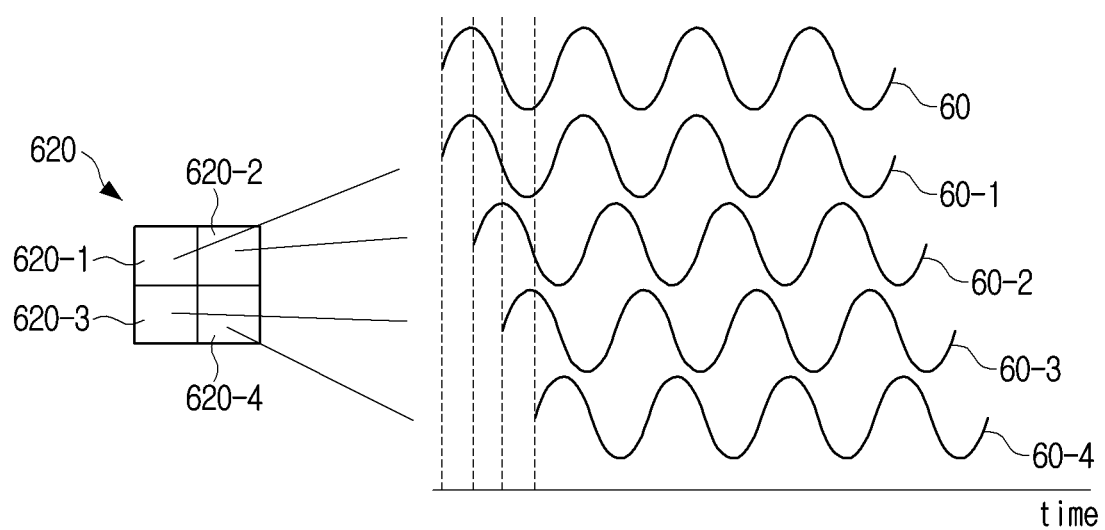
FIG. 6B is a diagram for describing a method for acquiring image data according to an embodiment.

The image data acquisition module 171 may acquire image data 61 based on reflected light 60. Specifically, the image data acquisition module 171 may acquire the image data based on electrical signals for reflected light acquired through a plurality of sensors that are activated with a time difference every preset time period. For example, as illustrated in FIG. 6B, a first sensor 620-1, a second sensor 620-2, a third sensor 620-3, and a fourth sensor 620-4 may be sequentially activated to acquire the reflected light 60. At this time, the image data acquisition module 171 may acquire first to fourth image data I1, I2, I3, and I4 based on electrical signals 60-1, 60-2, 60-3, and 60-4 for reflected light each acquired by the first to fourth sensors. Here, the electronic apparatus 100 may control each of the first sensor 620-1, the second sensor 620-2, the third sensor 620-3, and the fourth sensor 620-4 to be activated with a time difference corresponding to 90 degrees of a phase of an electrical signal with respect to the emitted light. In addition, each of the acquired image data I1, I2, I3, and I4 may include the intensity of the plurality of sensors 620-1, 620-2, 620-3, and 620-4 for each pixel.

The phase information acquisition module 172 may acquire phase information (φ) 62 by applying the image data 61 to [Mathematical Expression 2].

$$\varphi = \tan^{-1}\left(\frac{I2 - I4}{I1 - I3}\right) \quad \text{[Mathematical expression 2]}$$

Here, the phase information (φ) is a phase difference between the outgoing light and the reflected light, and I1 to I4 is the first to fourth image data, respectively.

Meanwhile, in FIG. 6B, it has been described that the first to fourth image data I1, I2, I3, and I4 are acquired through the four sensors, but the disclosure is not limited to four sensors, and the electronic apparatus 100 may acquire the first to fourth image data I1, I2, I3, and I4 using two sensors. For example, the first image data I1 and the third image data I3 may be acquired through the first sensor 620-1, and the second image data I2 and the fourth image data I4 may be acquired through the second sensor 620-2.

The depth image acquisition module 173 may acquire a depth image 63 by apply the phase information 62 acquired through the phase information acquisition module 172 to [Mathematical Expression 3].

$$\text{[Distance]} = \frac{1}{2} \cdot C_L \cdot \Delta t = \frac{1}{2} \cdot C_L \cdot T \cdot \frac{\varphi}{2\pi} \quad \text{[Mathematical expression 3]}$$

Here, $C_L$, is the speed of light, $\Delta t$ is the flight time of the light, T is a modulation period of the emitted light, and φ is the phase information 62.

The object distance acquisition module 174 may acquire corrected object distance information 64 from the depth image 63 by performing the correction operation as described in FIG. 5.

Figure 7:
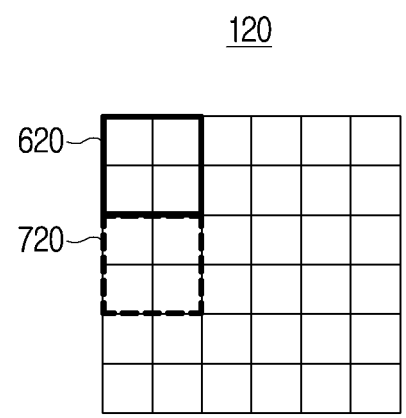
FIG. 7 is a schematic view illustrating a light receiver according to an embodiment.

FIG. 7 is a schematic view illustrating a light receiver according to an embodiment.

The light receiver 120 may include a sensor module configured with a plurality of sensor units arranged in an array form. The sensor module may include a first sensor unit 620 and a second sensor unit 720. As described in FIG. 6B, the electronic apparatus 100 may acquire the depth image through the plurality of sensors belonging to the first sensor unit 620. In addition, as described in FIG. 5, the electronic apparatus 100 may acquire the plurality of depth images corresponding to the preset time period.

Hereinafter, an implementation example of the light receiver 120 for such an operation will be described.

The electronic apparatus 100 may acquire the first depth image 53 by activating the first sensor unit 620 in the first time period T1-1. At this time, the electronic apparatus 100 may acquire the first depth image 53 by sequentially activating the plurality of sensors belonging to the first sensor unit 620 at predetermined time intervals. In addition, the electronic apparatus 100 may acquire the second depth image 55 by activating the second sensor unit 720 in the second time period T1-2. At this time, the electronic apparatus 100 may acquire the first depth image 53 by sequentially activating the plurality of sensors belonging to the second sensor unit 720 at predetermined time intervals. In addition, the electronic apparatus 100 may acquire the first depth image 53 and the second depth image 55 by activating other sensor units belonging to each row in which the first sensor unit 620 and the second sensor unit 720 are located. That is, the electronic apparatus 100 may acquire the depth image by controlling the sensor units in a row or column unit. In this way, the sensor module may not acquire one depth image with all sensor units, but may acquire a plurality of depth images with each sensor unit.

However, this is only an example, and the electronic apparatus 100 may acquire the depth image using the entirety of the plurality of sensor units including the first sensor unit 620 and the second sensor unit 720 in each time period. For example, the electronic apparatus 100 may acquire the first depth image 53 by activating the entirety of the sensor units in the first time period T1-1. In addition, the electronic apparatus 100 may acquire the second depth image 55 by activating the entirety of the sensor units in the second time period T1-2. In this way, by acquiring the depth image using the entirety of the sensor units included in the light receiver 120, a resolution of the depth image may be increased.

Hereinabove, a method of acquiring distance information on a distant object by processing the depth image corresponding to each time period to correct the object distance has been described. On the other hand, in order to measure the distance of the object existing at a long distance, the emitted light needs to be able to reach the long distance. There is a method of increasing the intensity of the emitted light in order to emit the emitted light to the long distance, but increasing the intensity of the emitted light increases power consumption. Hereinafter, an electronic apparatus capable of transmitting emitted light to a long distance by controlling a lens unit without increasing the intensity of the emitted light will be described.

Figure 8:
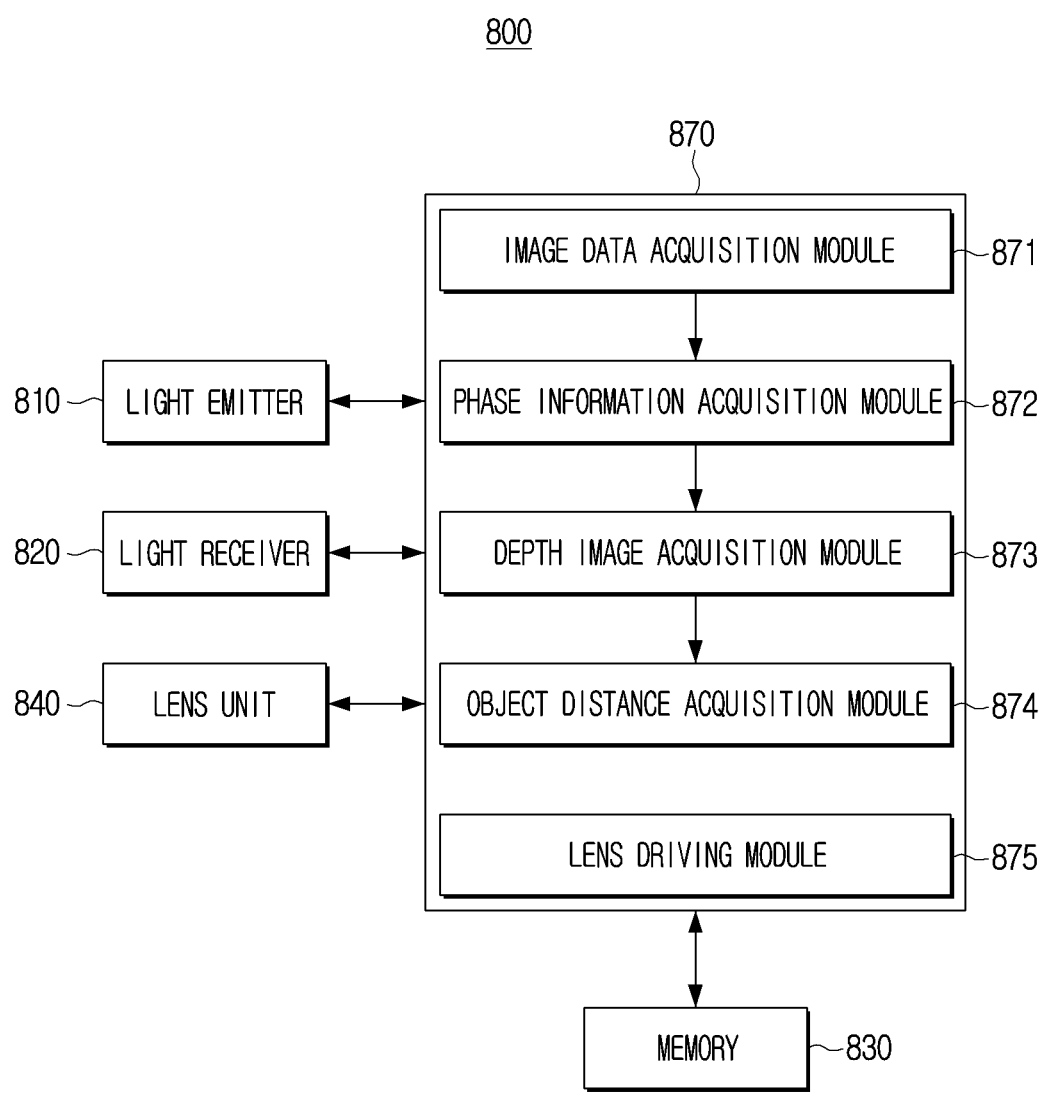
FIG. 8 is a diagram illustrating a configuration of an electronic apparatus according to another embodiment.

FIG. 8 is a diagram illustrating a configuration of an electronic apparatus according to another embodiment.

Referring to FIG. 8, an electronic apparatus 800 may include a light emitter 810, a light receiver 820, a memory 830, a processor 870, and a lens unit 840. In addition, the processor 870 may include an image data acquisition module 871, a phase information acquisition module 872, a depth image acquisition module 873, an object distance acquisition module 874, and a lens driving module 875. Meanwhile, the remaining components of the electronic apparatus 800 except for the lens driving module 875 and the lens unit 840 are duplicated with the configuration of the electronic apparatus 100 of FIG. 4, and thus, detailed descriptions thereof will be omitted.

The lens unit 840 may be a component for controlling an emission direction of light emitted from the light emitter 810. In particular, the lens unit 840 may form a field of view (FOV) of the electronic apparatus 800 by refracting the emitted light. For example, the electronic apparatus 800 may have a field of view of 60 degrees in a horizontal direction. Meanwhile, the lens unit 840 may include a zoom-lens for adjusting the field of view, a collimator for forming parallel light from the emitted light, and a light receiver 820 for guiding reflected light reflected from an object to the light receiver 820.

Meanwhile, the lens driving module 875 may control the lens unit 840. In particular, the lens driving module 875 may adjust the field of view of the electronic apparatus 800 by controlling the zoom lens included in the lens unit 840. Specifically, the lens driving module 875 may adjust the field of view by adjusting a distance between the light emitter 810 and the zoom lens. In addition, the lens driving module 875 may control an emission distance of the emitted light by using the zoom lens included in the lens unit 840. For example, the lens driving module 875 may reduce the field of view of the electronic apparatus 800 by adjusting the distance between the light emitter 810 and the zoom lens, and increase the emission distance of the emitted light emitted from the light emitter 810. Accordingly, a measurable distance of the electronic apparatus 800 may be increased without an increase in power for outputting the light output from the light emitter 810.

Figure 9A:
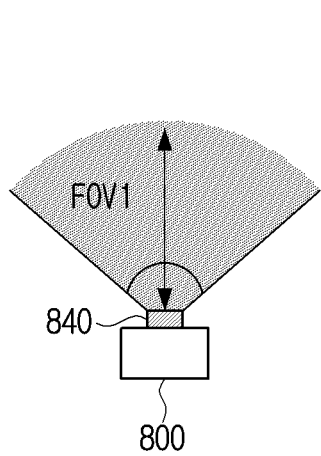
FIGS. 9A-9C are diagrams illustrating states in which a field of view of an electronic apparatus and an emission distance of emitted light are adjusted according to an embodiment.
Figure 9B:
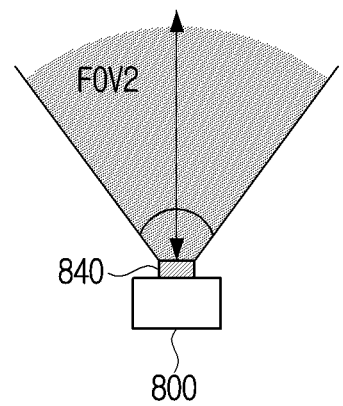
Figure 9C:
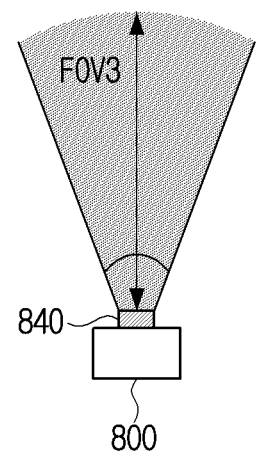

FIGS. 9A, 9B and 9C are diagrams illustrating states in which a field of view of an electronic apparatus and an emission distance of emitted light are adjusted according to an embodiment.

As illustrated in FIGS. 9A, 9B and 9C, the electronic apparatus 800 may adjust a field of view and an emission distance of the emitted light by controlling the lens unit 840.

The electronic apparatus 800 according to FIG. 9A may have a larger field of view and a smaller output distance of the emitted light than the electronic apparatus 800 according to FIG. 9B. In addition, the electronic apparatus 800 according to FIG. 9B may have a larger field of view and a smaller output distance of the emitted light than the electronic apparatus 800 according to FIG. 9C.

The lens driving module 875 may control the lens unit 840 so that the field of view of the electronic apparatus 800 is adjusted in synchronization with a time period in which the depth image acquisition module 873 acquires a depth image. Specifically, the lens driving module 875 may control the lens unit 840 so that the field of view of the electronic apparatus 800 is changed every time period in which the depth image acquisition module 873 acquires the depth image. For example, the lens driving module 875 may control the lens unit 840 so that the electronic apparatus 800 has a first field of view FOV1 during the first time period T1-1. In addition, the lens driving module 875 may control the lens unit 840 so that the electronic apparatus 800 has a second field of view (FOV2) smaller than the first field of view FOV1 during the second time period T1-2. In addition, the electronic apparatus 800 may control the lens unit 840 so that a third field of view (FOV3) smaller than the second field of view FOV2 is formed during the third time period T1-3. In this way, the electronic apparatus 800 may increase the emission distance of the emitted light while maintaining the light output power by controlling the lens unit 840. However, this is only an example, and the field of view and measurement range of the electronic apparatus 800 may be adjusted in various ways.

Figure 10:
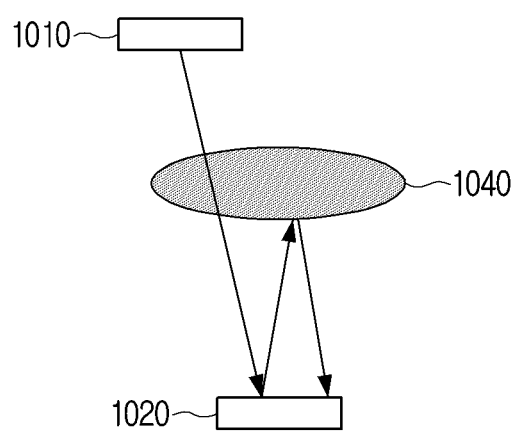
FIG. 10 is a diagram for describing a lens flare.

Meanwhile, the electronic apparatus 800 may include an anti-reflection (AR) coating member to prevent a lens flare or ghost phenomenon. The lens flare refers to a phenomenon in which reflected light reflected from an object 1010 is reflected by a light receiver 1020 and then reflected back to a lens unit 1040 to reach the light receiver 1020, as illustrated in FIG. 10. In particular, when the object 1010 is located relatively close to the electronic apparatus 800 and the intensity of the reflected light reflected from the object 1010 is greater than a threshold value, the flare phenomenon often occurs. When the lens flare occurs, depth values of the depth image acquired from the electronic apparatus may be distorted.

In order to prevent the lens flare, an anti-reflection (AR) coating layer may be formed on the lens unit 1040. Accordingly, the reflected light reflected from the light receiver 1020 and reaching the lens unit 1040 may not be reflected by the lens unit 1040 and may not reach the light receiver 1020.

In addition, when the distortion occurs in the acquired depth image due to the lens flare or the like, the electronic apparatus 800 may correct the depth image. Specifically, the electronic apparatus 800 may acquire a confidence image for the depth image and correct the depth image based on the acquired confidence image. Here, the confidence image refers to an image representing reliability of the depth value of each pixel of the depth image. Each pixel value of the confidence image may represent a reliability score for the depth value for each pixel of the depth image. The electronic apparatus 800 may acquire the confidence image for the depth image through [Mathematical Expression 4].

[Confidence]=abs(*I2*−*I4*)+abs(*I1*+*I3*) [Mathematical expression 4]

Here, I1 to I4 denote the first to fourth image data I1, I2, I3, and I4, respectively.

The electronic apparatus 800 may determine the reliability of the depth value for each pixel of the depth image based on each pixel value of the confidence image. If each pixel value of the confidence image is greater than a specific value, the electronic apparatus 800 may determine that the depth value of the corresponding pixel is reliable. According to an embodiment, the specific value is preset. At this time, the electronic apparatus 800 may not perform an operation of correcting the acquired depth image. On the other hand, if each pixel value of the confidence image is smaller than the preset value, the electronic apparatus 800 may determine that the depth value of the corresponding pixel is not reliable. At this time, the electronic apparatus 800 may acquire a corrected depth image based on the depth image and the confidence image. Specifically, the electronic apparatus 800 may acquire the corrected depth image ($d_c(i,j)$) through [Mathematical Expression 5].

[Mathematical expression 5]

$$d_c(i, j) = d(i, j) + \alpha \cdot \frac{\left(\frac{1}{2}P - d(i, j)\right)}{\text{Max}(c(i, j), C_{min})}$$

Here, $d(i,j)$ is a depth image acquired through the depth image acquisition module 873, $c(i,j)$ is a confidence image corresponding to the acquired depth image, and P is $$\frac{1}{2} \cdot C_L \cdot \frac{1}{f}$$

(here, f is a frequency of the emitted light signal, and $C_L$ is a speed of light). In addition, $\alpha$ indicates the degree of correction, and $C_{min}$ is a constant. According to an embodiment, $\alpha$ is a user-defined variable indicating the degree of correction, and $C_{min}$ and is a user-defined constant.

In this way, the electronic apparatus 800 may improve the accuracy of object distance information by performing the operation of correcting the depth image.

Figure 11:
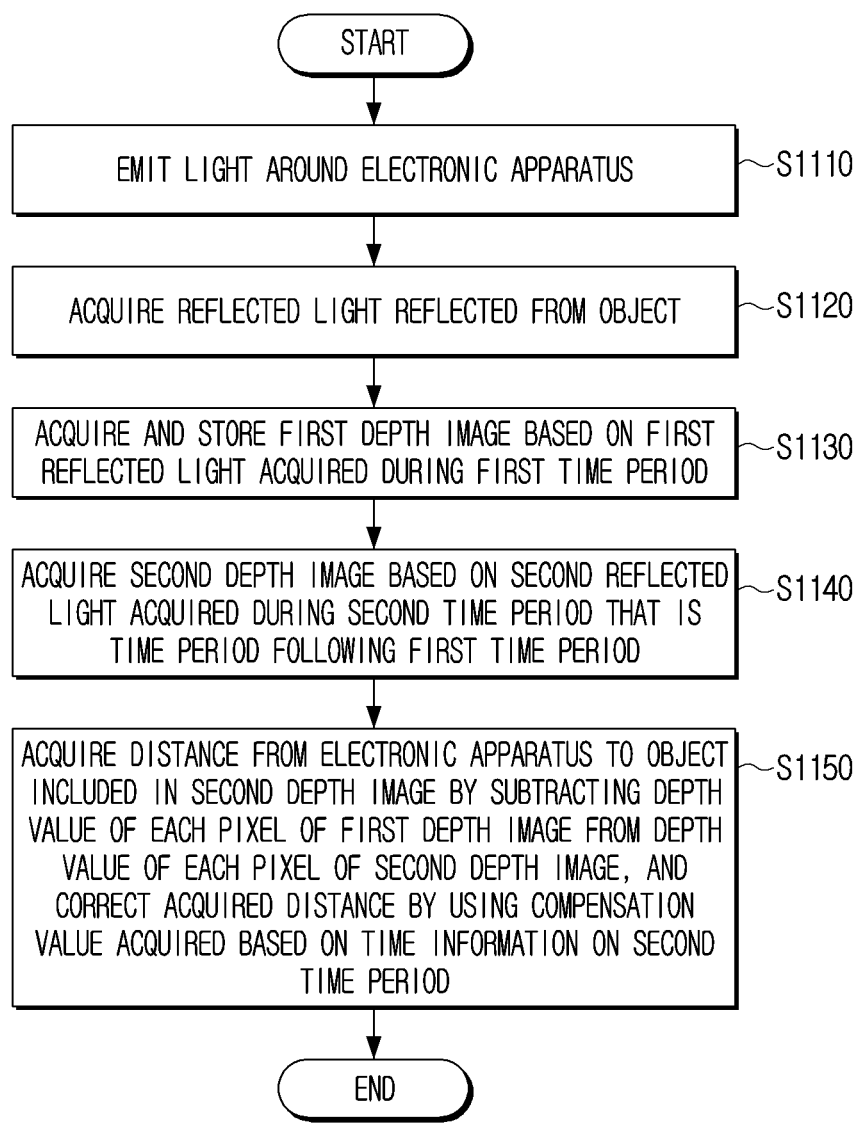
FIG. 11 is a flowchart illustrating a method for controlling an electronic apparatus according to an embodiment.

FIG. 11 is a flowchart illustrating a method for controlling an electronic apparatus according to an embodiment.

The electronic apparatus 100 may emit light (S1110), and acquire reflected light reflected from an object (S1120). According to an embodiment, the electronic apparatus 100 may emit light towards an area around the electronic apparatus 100. The electronic apparatus 100 may acquire a first depth image based on first reflected light acquired during a first time period and store the first reflected light in a memory (S1130). In addition, the electronic apparatus 100 may acquire a second depth image based on second reflected light acquired during a second time period, which is a time period following the first time period (S1140). At this time, when it is determined that the depth value of the depth image for each time period is not reliable, the electronic apparatus 100 may acquire a corrected depth image by using a confidence image corresponding to the depth image. Meanwhile, for a detailed description of a method of acquiring a depth image, refer to FIGS. 6A and 6B.

The electronic apparatus 100 may acquire a distance from the electronic apparatus to an object included in the second depth image by subtracting the depth value of each pixel of the first depth image from the depth value of each pixel of the second depth image, and may correct the acquired distance by using the compensation value acquired based on time information on the second time period (S1150). For a detailed description of such an operation, refer to FIG. 5.

Figure 12:
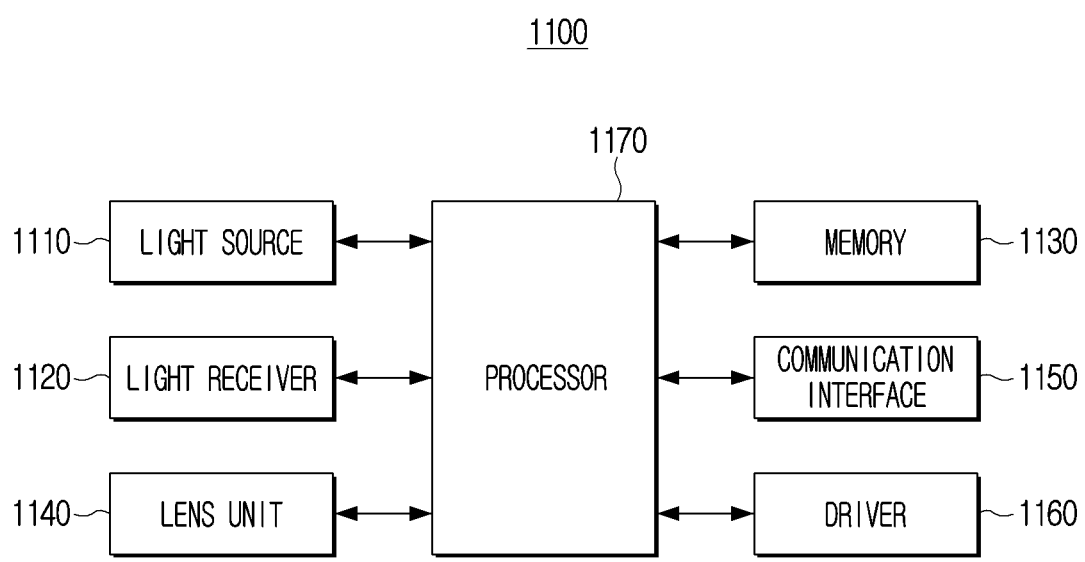
FIG. 12 is a block diagram illustrating a configuration of an electronic apparatus according to an embodiment.

FIG. 12 is a block diagram illustrating a configuration of an electronic apparatus according to an embodiment. An electronic apparatus 1100 may be implemented as a robot device capable of acquiring distance information on an object, but is not limited thereto.

Referring to FIG. 12, the electronic apparatus 1100 may include a light source 1110, a light receiver 1120, a lens unit 1140, a memory 1130, a communication interface 1150, a driver 1160, and a processor 1170. Meanwhile, redundant descriptions of the light source 1110, the light receiver 1120, the lens unit 1140, the memory 1130, and the processor 1170 will be omitted.

The communication interface 1150 may include at least one circuit and may communicate with various types of external devices. For example, the communication interface 1150 may communicate with an external server or a user terminal. In addition, the communication interface 1150 may communicate with an external device according to various types of communication methods. The communication interface 1150 may perform data communication in a wireless or wired manner. When performing communication with the external device in the wireless communication manner, the communication interface 1150 may include at least one of a Wi-Fi communication module, a cellular communication module, a 3G (3rd generation) mobile communication module, a 4G (4th generation) mobile communication module, a 4th generation Long Term Evolution (LTE) communication module, or a 5G (5th generation) mobile communication module. Meanwhile, the communication interface 1150 according to an embodiment may be implemented as a wireless communication module, but this is only an embodiment, and the communication interface 1150 may be implemented as a wired communication module (e.g., LAN and the like).

The driver 1160 may be a component for moving the electronic apparatus 1100. In particular, the driver 1160 may include an actuator for driving the electronic apparatus 1100. In addition, an actuator for driving motion of other physical components (e.g., an arm and the like) of the electronic apparatus 1100 may be included in addition to the driver 1160.

Meanwhile, the diverse embodiments described above may be implemented in a computer or a computer readable recording medium using software, hardware, or a combination of software and hardware. In some cases, the embodiments described in the specification may be implemented by the processor itself. According to software implementation, the embodiments such as procedures and functions described in the disclosure may be implemented as separate software modules. Each of the software modules may perform one or more functions and operations described in the disclosure.

Meanwhile, computer instructions for performing processing operations according to the diverse embodiments described above may be stored in a non-transitory computer-readable medium. The computer instructions stored in the non-transitory computer-readable medium may allow a specific device to perform the processing operations according to the diverse embodiments described above when they are executed by a processor.

The non-transitory computer-readable medium is not a medium that stores data for a short time such as a register, a cache, a memory, or the like, but means a machine readable medium that semi-permanently stores data. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

Although the embodiments have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
    a light emitter configured to emit light towards an area around the electronic apparatus as emitted light;
    a light receiver configured to acquire reflected light from an object that reflects the emitted light emitted from the light emitter;
    a memory storing one or more instructions; and
    a processor configured to execute the one or more instructions to: acquire a first depth image based on first reflected light acquired through the light receiver during a first time period and store the first depth image in the memory,
    acquire a second depth image based on second reflected light acquired through the light receiver during a second time period following the first time period, and
    acquire distance information between the electronic apparatus and the object included in the second depth image by subtracting a first depth value of each pixel of the first depth image stored in the memory from a second depth value of each pixel of the second depth image, and correct the distance information by using a compensation value acquired based on time information corresponding to the second time period.

2. The electronic apparatus as claimed in claim 1, wherein the processor is further configured to execute the one or more instructions to acquire the compensation value based on the time information corresponding to the second time period and a wavelength of the emitted light.

3. The electronic apparatus as claimed in claim 1, wherein the processor is further configured to execute the one or more instructions to:
    acquire image data based on the emitted light and the first reflected light,
    acquire phase information of the first reflected light based on the image data, and
    acquire the first depth image based on the phase information of the first reflected light.

4. The electronic apparatus as claimed in claim 3, wherein the light receiver includes a plurality of sensors including a first sensor and a second sensor, and
    the processor is further configured to execute the one or more instructions to:
    control the light receiver so that the first sensor and the second sensor are activated at a preset time difference, acquire the image data by acquiring first image data and second image data based on the first reflected light acquired by each of the first sensor and the second sensor, and acquire the phase information on the first reflected light based on the first image data and the second image data.

5. The electronic apparatus as claimed in claim 1, wherein the light receiver includes a first sensor unit and a second sensor unit, each of the first and second sensor units including a plurality of sensors, and the processor is further configured to execute the one or more instructions to control the light receiver so that the first sensor unit is activated in synchronization with the first time period and the second sensor unit is activated in synchronization with the second time period.

6. The electronic apparatus as claimed in claim 1, further comprising a lens unit provided on an emission path of the emitted light, the lens unit being configured to adjust an emission range of the emitted light, wherein the processor is further configured to execute the one or more instructions to control the lens unit to adjust the emission range of the emitted light in synchronization with the first time period and the second time period.

7. The electronic apparatus as claimed in claim 6, wherein the lens unit includes a non-reflective coating member configured to prevent at least a portion of the reflected light acquired by the light receiver from being reflected by the light receiver and then reflected by the lens unit to reach the light receiver again.

8. The electronic apparatus as claimed in claim 1, wherein the processor is further configured to execute the one or more instructions to:

acquire a confidence image indicating reliability of the second depth value of each pixel of the second depth image, and update the second depth image using the confidence image.

9. The electronic apparatus as claimed in claim 1, wherein the processor is further configured to execute the one or more instructions to correct the distance information by adding the compensation value to a depth value of a pixel corresponding to the object in the second depth image.

10. The electronic apparatus as claimed in claim 1, wherein the light emitter is further configured to emit the light at a first frequency, and wherein both the first reflected light and the second reflected light acquired through the light receiver correspond to the light at the first frequency.

11. The electronic apparatus as claimed in claim 1, wherein the object included in the second depth image is detected based on a distribution of the second depth value of each pixel of the second depth image.

12. A method for controlling an electronic apparatus, the method comprising:

emitting light toward an area around the electronic apparatus as emitted light;

acquiring reflected light from an object that reflects the emitted light emitted from a light emitter;

acquiring and storing a first depth image based on first reflected light acquired during a first time period;

acquiring a second depth image based on second reflected light acquired during a second time period following the first time period; and acquiring distance information between the electronic apparatus and the object included in the second depth image by subtracting a first depth value of each pixel of the stored first depth image from a second depth value of each pixel of the second depth image, and correcting the distance information by using a compensation value acquired based on time information corresponding to the second time period to acquire the distance.

13. The method as claimed in claim 12, wherein the correcting of the distance information includes acquiring the compensation value based on the time information corresponding to the second time period and a wavelength of the emitted light.

14. The method as claimed in claim 12, wherein the acquiring of the first depth image includes:

acquiring image data based on the emitted light and the first reflected light, acquiring phase information of the first reflected light based on the image data, and acquiring the first depth image based on the phase information on the first reflected light.

15. The method as claimed in claim 14, wherein in the acquiring of the phase information, the phase information on the first reflected light is acquired based on a plurality of image data acquired through a plurality of sensors activated at a preset time difference.

16. The method as claimed in claim 12, wherein the acquiring of the first depth image includes controlling a first sensor unit and a second sensor unit so that the first sensor unit and the second sensor unit each including a plurality of sensors are activated in synchronization with the first time period and the second time period, respectively.

17. The method as claimed in claim 12, further comprising controlling an emission range of the emitted light in synchronization with the first time period and the second time period.

18. The method as claimed in claim 12, wherein the acquiring of the second depth image includes:

acquiring a confidence image indicating reliability of the second depth value of each pixel of the second depth image, and updating the second depth image using the confidence image.

19. An electronic apparatus comprising:

a memory storing one or more instructions; and a processor configured to execute the one or more instructions to:

acquire a first reflected light during a first time period;

acquire the second reflected light during a second time period;

acquire a first depth image based on the first reflected light;

acquire a second depth image based on the second reflected light;

acquire distance information on a first object in the second depth image after performing correction on the second depth image by acquiring a virtual depth image by subtracting a first depth value of each pixel of the first depth image from a second depth value of each pixel of the second depth image.

20. The electronic apparatus of claim 19, wherein the first reflected light and the second reflected light are acquired by repeatedly emitting light in an area around the electronic apparatus.

21. The electronic apparatus of claim 19, wherein the first depth image includes first depth information on a second object, and the second depth image includes second depth information on the first object and the second object.

22. The electronic apparatus of claim 19, wherein the processor is further configured to execute the one or more instructions to acquire a compensation value for performing the correction on the second depth image based on a frequency of the emitted light, luminous flux, and a number corresponding to the second time period.

* * * * *